(12) United States Patent
Terai et al.

(10) Patent No.: US 10,545,350 B2
(45) Date of Patent: Jan. 28, 2020

(54) LENS ELEMENT AND IMAGING LENS UNIT

(71) Applicant: KANTATSU CO., LTD., Yaita-shi, Tochigi (JP)

(72) Inventors: Yoshikazu Terai, Sukagawa (JP); Shigeru Endo, Sukagawa (JP); Takanori Sato, Sukagawa (JP)

(73) Assignee: KANTATSU CO., LTD., Yaita-shi, Tochigi (JP)

( * ) Notice: Subject to any disclaimer, the term of this patent is extended or adjusted under 35 U.S.C. 154(b) by 0 days.

(21) Appl. No.: 15/915,744

(22) Filed: Mar. 8, 2018

(65) Prior Publication Data

US 2019/0049737 A1 Feb. 14, 2019

(30) Foreign Application Priority Data

Mar. 8, 2017 (JP) .................. 2017-043746

(51) Int. Cl.
| | |
|---|---|
| *G02B 1/10* | (2015.01) |
| *G02B 27/09* | (2006.01) |
| *G02B 5/00* | (2006.01) |
| *B05D 1/00* | (2006.01) |
| *B29D 11/00* | (2006.01) |

(52) U.S. Cl.
CPC .......... *G02B 27/0955* (2013.01); *B05D 1/60* (2013.01); *B29D 11/00865* (2013.01); *G02B 1/10* (2013.01); *G02B 5/003* (2013.01)

(58) Field of Classification Search
CPC ...... B05D 1/60; B05D 1/00; B29D 11/00865; B29D 11/00923; B29D 11/00; G02B 1/10; G02B 27/0955; G02B 5/003; G02B 27/09; G02B 5/00
See application file for complete search history.

(56) References Cited

U.S. PATENT DOCUMENTS

| | | | | |
|---|---|---|---|---|
| 8,102,610 B2 * | 1/2012 | Chen | ............. | G02B 7/021 |
| | | | | 359/819 |
| 8,320,059 B2 * | 11/2012 | Lin | ............. | G02B 5/003 |
| | | | | 359/740 |
| 8,503,114 B2 * | 8/2013 | Lai | ............. | G02B 13/0035 |
| | | | | 359/811 |
| 8,570,672 B2 * | 10/2013 | Lin | ............. | G02B 7/021 |
| | | | | 359/738 |

(Continued)

FOREIGN PATENT DOCUMENTS

| | | |
|---|---|---|
| CN | 205333947 U | 6/2016 |
| JP | 2001-230396 A | 8/2001 |

(Continued)

*Primary Examiner* — William R Alexander
*Assistant Examiner* — Balram T Parbadia
(74) *Attorney, Agent, or Firm* — Hamre, Schumann, Mueller & Larson, P.C.

(57) ABSTRACT

There is provided a lens element which can maintain an accuracy of the axis alignment between the lens elements and effectively suppress occurrence of ghosting and flares, and an imaging lens unit including such lens element. The fourth lens element 40 of the imaging lens unit 1 integrally comprises a lens portion 41 and an edge portion 42 surrounding the lens portion. The edge portion 42 is provided with an annular step portion 43 as an abut portion for axis alignment with a third lens element 30, and a light shielding portion 46 formed of vapor-deposited films are provided at the annular step portion 43.

12 Claims, 4 Drawing Sheets

(56) References Cited

U.S. PATENT DOCUMENTS

| | | | |
|---|---|---|---|
| 2004/0085626 A1 | 5/2004 | Nishimura et al. | |
| 2004/0219438 A1* | 11/2004 | Wu | G03F 1/36 430/5 |
| 2010/0110569 A1* | 5/2010 | Lin | G02B 7/021 359/819 |
| 2011/0052180 A1* | 3/2011 | Pei | G02B 5/003 396/439 |
| 2011/0267684 A1* | 11/2011 | Pei | G02B 5/005 359/359 |
| 2011/0279913 A1* | 11/2011 | Watanabe | G02B 3/00 359/728 |
| 2013/0027787 A1* | 1/2013 | Yen | G02B 13/0045 359/763 |
| 2013/0027788 A1* | 1/2013 | Yen | G02B 13/0045 359/763 |
| 2013/0301140 A1* | 11/2013 | Matsuno | G02B 3/0062 359/619 |
| 2014/0029114 A1* | 1/2014 | Kim | G02B 3/08 359/709 |
| 2014/0078606 A1* | 3/2014 | Wu | G02B 7/025 359/827 |
| 2014/0091419 A1* | 4/2014 | Hasegawa | G02B 13/004 257/432 |
| 2014/0104691 A1* | 4/2014 | Chang | G02B 7/021 359/611 |
| 2014/0160581 A1* | 6/2014 | Cho | G02B 27/0018 359/738 |
| 2014/0204476 A1* | 7/2014 | Takase | G02B 7/021 359/738 |
| 2014/0209901 A1* | 7/2014 | Sakata | H01L 21/02554 257/43 |
| 2014/0254034 A1* | 9/2014 | Lyu | G02B 7/021 359/819 |
| 2015/0103226 A1* | 4/2015 | Takahashi | G02B 1/118 348/335 |
| 2015/0103407 A1 | 4/2015 | Chen | |
| 2016/0011415 A1* | 1/2016 | Takada | G02B 27/0018 348/148 |
| 2016/0313472 A1* | 10/2016 | Huang | G02B 5/003 |
| 2016/0349504 A1* | 12/2016 | Kim | G02B 27/0018 |
| 2016/0370580 A1* | 12/2016 | Takada | G02B 5/005 |
| 2017/0108627 A1* | 4/2017 | Chou | G02B 5/003 |
| 2017/0176649 A1 | 6/2017 | Chang | |
| 2017/0227735 A1* | 8/2017 | Chou | G02B 13/0045 |
| 2018/0259749 A1* | 9/2018 | Moriya | B29D 11/00298 |

FOREIGN PATENT DOCUMENTS

| | | |
|---|---|---|
| JP | 2004-151624 A | 5/2004 |
| JP | 2008-122801 A | 5/2008 |
| JP | 2015-200690 A | 11/2015 |
| JP | 2015-225102 | 12/2015 |
| JP | 2016-206326 A | 12/2016 |
| WO | 2012/098808 A1 | 7/2012 |
| WO | 2013/047682 A | 3/2015 |

* cited by examiner

LENS ELEMENT AND IMAGING LENS UNIT

The present application is based on and claims priority of Japanese patent application No. 2017-043746 filed on Mar. 8, 2017, the entire contents of which are hereby incorporated by reference.

The present invention relates to a lens element and an imaging lens unit comprising a plurality of the lens elements.

As a factor of preventing excellent imaging performance in the imaging lens unit, occurrence of ghosting and flares due to unnecessary light reflected in the lens unit is considered. Technology for suppressing the occurrence of the ghosting and flares is disclosed, such as a method of providing an edge portion with a light shielding film, and the edge portion surrounds lens portion of the lens element which functions as a lens.

For example, Patent Literature 1 (CN205333947U) discloses an imaging lens includes a plurality of lens elements, wherein one of the lens elements is a plastic lens element, and a coating for absorbing light is made on a connecting portion connected with an effective optical portion on one surface of an object-side surface and an image-side surface of the plastic lens element and a fitting portion fitting an adjacent lens. Patent Literature 2 (JP2015-225102-A) discloses an imaging lens comprising five or more lenses including, in order from an object side, a first lens having positive refractive power, and a second lens having negative refractive power, wherein a light shielding film is formed at an effective diameter outside portion of at least one surface of an image-side surface of the first lens and an object-side and an image-side surfaces of the second lens.

SUMMARY OF THE INVENTION

According to the imaging lens disclosed in Patent Literature 1, the coating is made on the connecting portion for connecting the effective optical portion of the lens element and the fitting portion fitting an adjacent lens, however, the coating is not made on the fitting portion with the adjacent lens element. Therefore, there may be occurred the ghosting and flares by passing unnecessary light through the fitting portion. The fitting portion has a configuration to be effective for axis alignment between the lens elements and to affect an optical performance. By flowing paint including resin to obtain coating as disclosed in the Patent Literature 1, thickness becomes uneven and such coating on the fitting portion may deteriorate the optical performance. Furthermore, the imaging lens disclosed in the Patent Literature 2 is provided with light absorbing material on almost all surface of a flange portion and a side surface thereof formed around the effective optical portion of the lens element. Therefore, the imaging lens disclosed in the Patent Literature 2 is excellent in shielding performance, however, does not have a configuration for axis alignment by directly stacking the lenses. Accordingly, it is difficult to obtain the imaging lens which is excellent in the imaging performance having both basic characteristics and shielding performance of the lens.

The present invention has been made in view of the above problems, and an object of the present invention is to provide a lens element and an imaging lens unit comprising the lens elements which maintains accuracy of an axis alignment between the lens elements and effectively suppress occurrence of the ghosting and flares.

A lens element according to an embodiment of the present invention comprises a lens portion and an edge portion located surrounding the lens portion. The edge portion is provided with an abut portion for making axis alignment with other lens element, and a light shielding portion made of vapor-deposited films is formed at an area of the edge portion including the abut portion is provided.

According to the present invention, the light shielding portion made of the vapor-deposited film having an even thickness is formed at the area of the edge portion including the abut portion, therefore unnecessary light passing through the abut portion can be shielded without degrading an accuracy of the axis alignment. Furthermore, mass productivity can be increased by vapor deposition method.

According to the present invention, it is preferable that thickness of the light shielding portion is 50 nm or more. Thus configured, shielding performance can be effectively secured.

According to the present invention, it is preferable that transmission rate of the light shielding portion is 50% or less, and reflection rate is 20% or less. Thus configured, degradation in the imaging performance is effectively suppressed by securing the shielding performance and suppressing reflection of the light.

According to the present invention, it is preferable that the light shielding portion is formed of the vapor-deposited film made of titanium or titanium oxide, or the vapor-deposited film made of chromium. Thus configured, it becomes available to keep balance of the shielding performance and cost.

According to the present invention, it is preferable that the light shielding portion is formed by laminating the vapor-deposited film made of a plurality different kinds of materials. By laminating a plurality of vapor-deposited films having different characteristics, characteristics complement each other, reliability in film crack and pealing especially under high temperature environment is enhanced and the light shielding portion having the high shielding performance can be provided.

According to the present invention, it is preferable that the light shielding portion has a lamination structure having two or more layers in which the vapor-deposited film of the titanium or titanium oxide, and the vapor-deposited film made of chromium are laminated alternatively. Thus configured, there is obtained a configuration of the light shielding portion which realizes both the reliability and the shielding performance.

According to the present invention, it is preferable that thickness of the vapor-deposited film is 50 nm or more. Thus configured, shielding performance can be effectively secured.

According to the present invention, it is preferable that thickness of the vapor-deposited film of the titanium or the titanium oxide is 400 nm or more. Thus configured, shielding performance can be effectively secured.

According to the present invention, it is preferable that the light shielding portion is sandwiched with the vapor-deposited films made of silicon oxide or magnesium fluoride. Thus configured, light reflection at the light shielding portion can be effectively suppressed.

According to the present invention, it is preferable that thickness of the vapor-deposited films made of silicon oxide or magnesium fluoride is 20 nm or more. Thus configured, light reflection at the light shielding portion can be effectively suppressed.

An imaging lens unit according to an embodiment of the present invention is the imaging lens unit comprising a plurality of the lens elements, and at least one lens element comprises the above-described light shielding portion.

According to the present invention, at least one lens element has the light shielding portion comprising the vapor-deposited film having an even thickness which is formed at the area of the edge portion including the abut portion with an adjacent lens. Therefore, unnecessary light passing through the abut portion can be shielded without degrading an accuracy of the axis alignment.

EFFECT OF INVENTION

According to the present invention, there can be provided a lens element which can maintain an accuracy of the axis alignment between the lens elements and effectively suppress occurrence of ghosting and flares, and an imaging lens unit including such lens element.

DETAILED DESCRIPTION OF THE PREFERRED EMBODIMENT

Hereinafter, the imaging lens unit according to the preferred embodiment of the present invention will be described in detail referring to the accompanying drawings.

Figure 1:
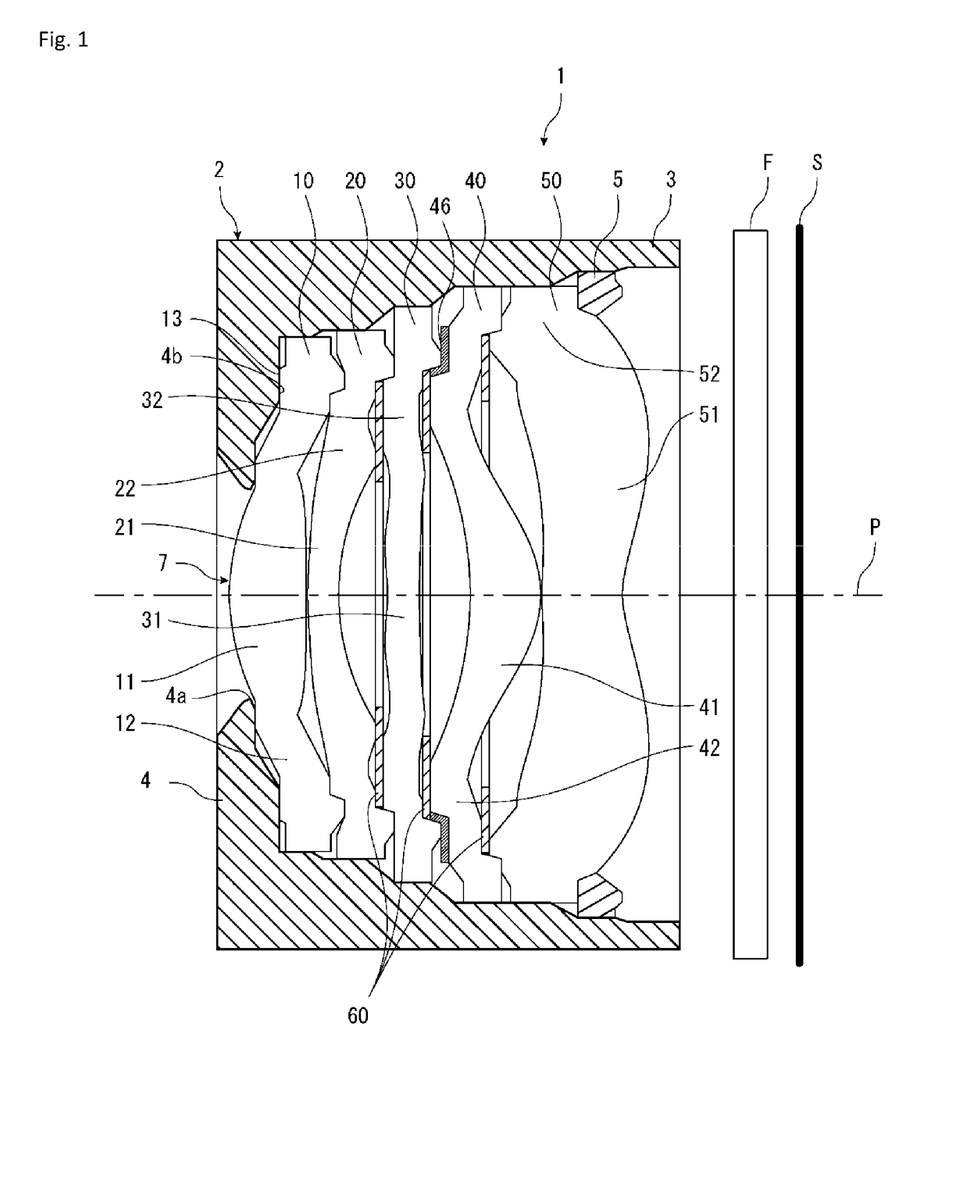
FIG. 1 is a cross-sectional view of an imaging lens unit according to first embodiment of the present invention.
Figure 2:
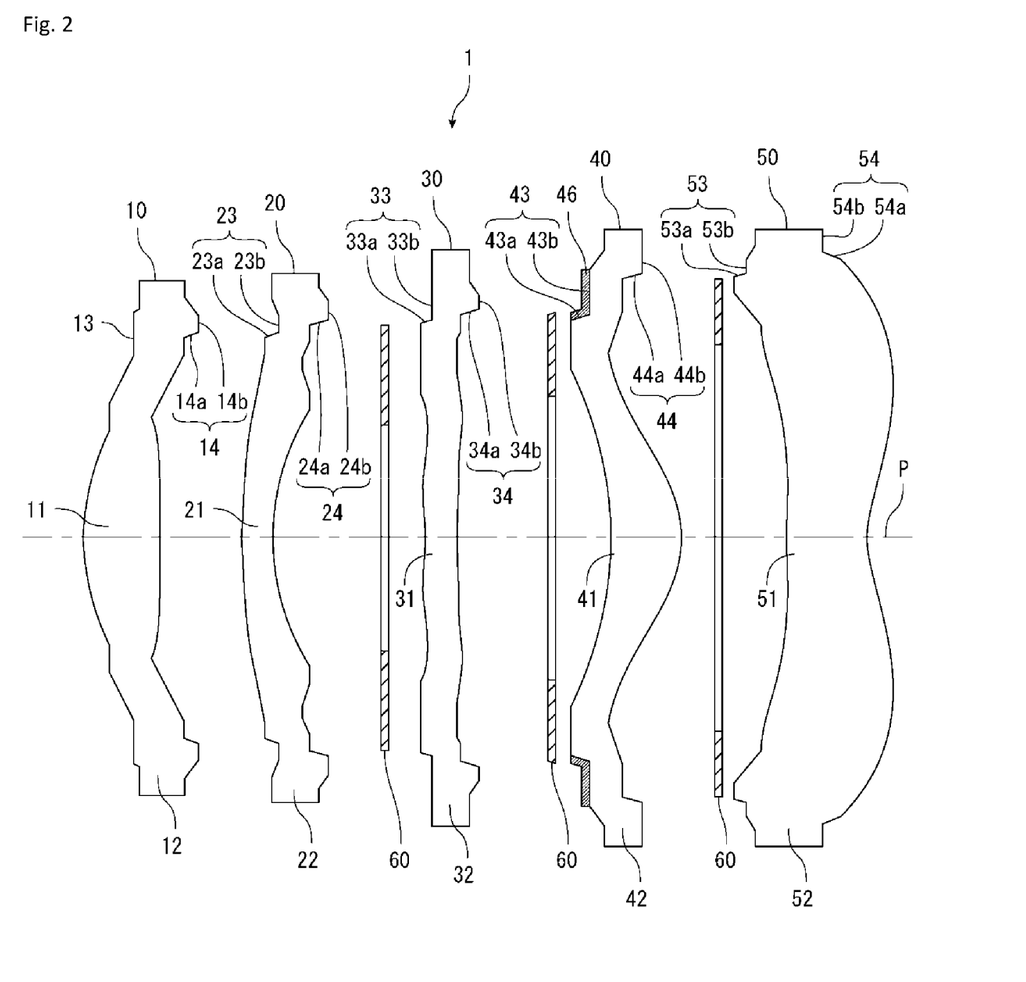
FIG. 2 is an exploded view of a lens assembly of the imaging lens unit of FIG. 1.
Figure 3:
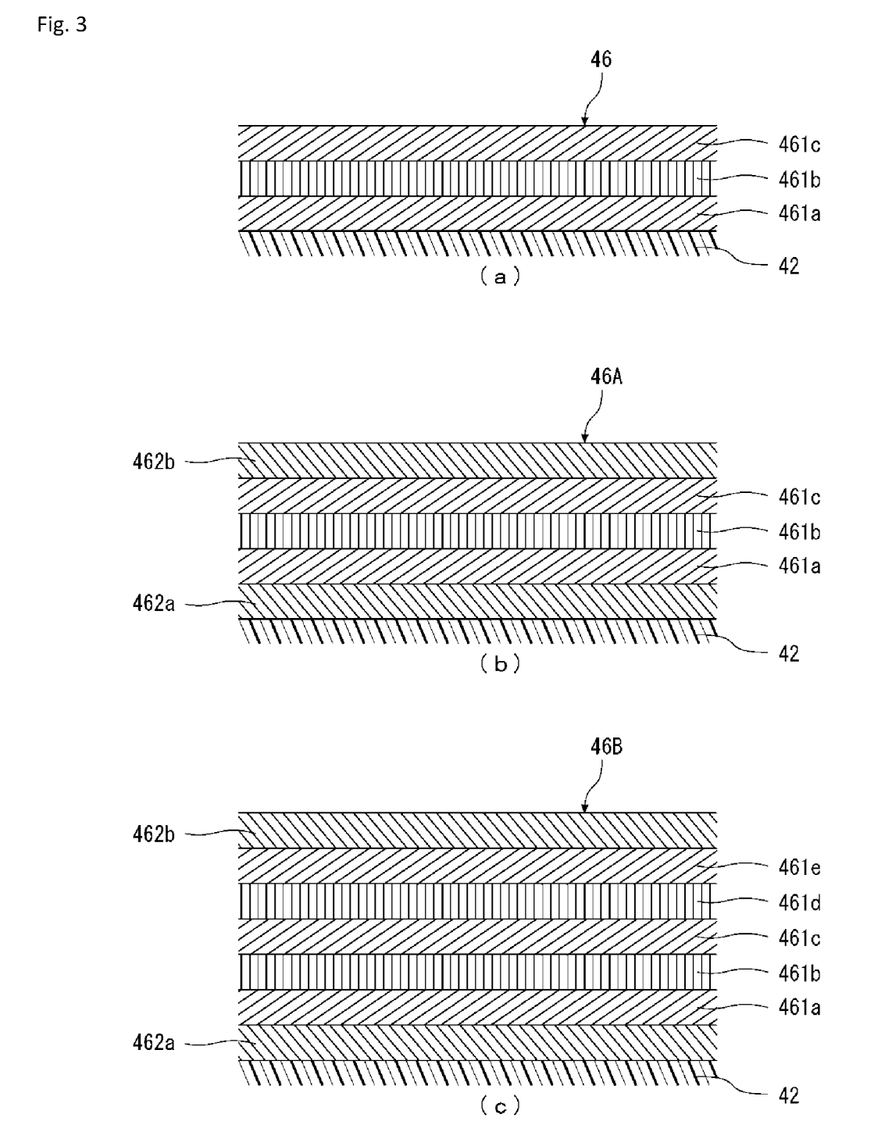
FIG. 3 is diagrams illustrating a structure of a light shielding portion of the lens elements.
Figure 4:
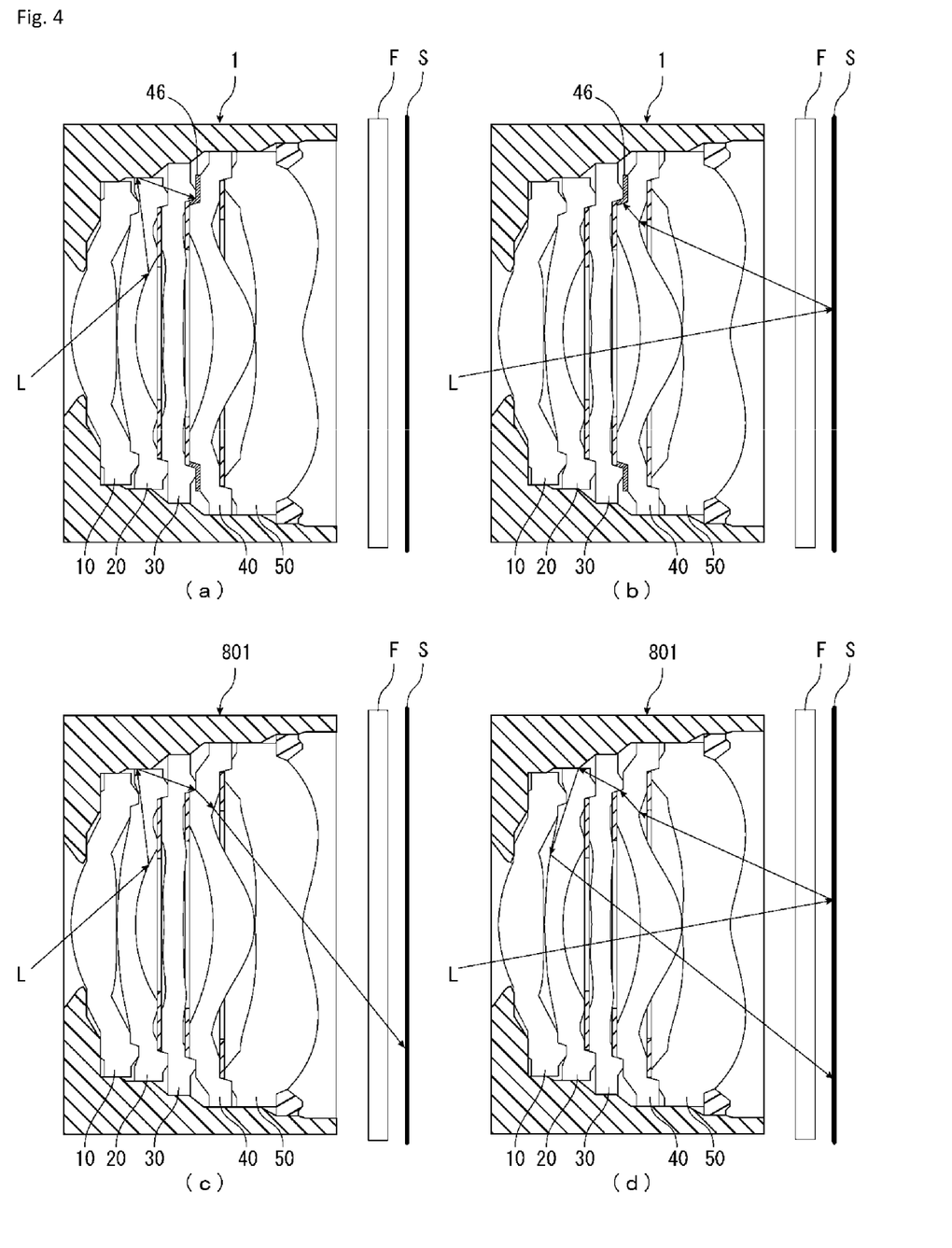
FIG. 4 is diagrams illustrating an example of optical path of the imaging lens unit.

FIG. 1 is a cross-sectional view of an imaging lens unit according to the first embodiment of the present invention. FIG. 2 is an exploded view of a lens assembly of the imaging lens unit of FIG. 1. In FIGS. 1 and 2, hatching of the cross section of each lens element is omitted. FIG. 3 is a diagram illustrating a structure of a light shielding portion of the lens elements. FIG. 4 is a diagram illustrating an example of optical path of the imaging lens unit, (a) and (b) show aspects according to the embodiment of the present invention. (c) and (d) show basically same configuration as (a) and (b), however, the light shielding portion is not provided. It should be noted that in the following description, the left side of FIG. 1 and FIG. 2 is defined as the front side (or the object side), and the right side is defined as the rear side (or the image side), however, it just shows relative positional relationship of each component, but not absolute positional relationship.

As shown in FIG. 1, the imaging lens unit 1 according to the present invention is provided in the camera of a portable information terminal, for example, and is used in combination with an imaging sensor S and an infrared cut filter F.

The imaging lens unit 1 includes a lens barrel 2 and a lens assembly 7 housed in the lens barrel 2.

The lens barrel 2 is formed of synthetic resins such as non-translucent resin, and integrally comprises a cylindrical peripheral wall portion 3 having front and rear openings, and a front wall portion 4 being disposed so as to block a front end portion of the peripheral wall portion 3 and having an opening 4a at its center. A receiving surface 4b of the lens element provided behind the front wall portion 4 is formed so as to be perpendicular to the optical axis P. A first lens element 10 to be described later is in contact with the receiving surface 4b. An annular fixing member 5 is fixed using a bond at rear side of an inner circumferential surface of the peripheral wall portion 3 so that the lens assembly 7 is housed and maintained in the lens barrel 2.

The lens assembly 7 comprises, in order from the front side to the rear side, a first lens element 10, a second lens element 20, a third lens element 30, a fourth lens element 40 and a fifth lens element 50, which are stacked. The light shielding plates 60 are disposed between the second lens element 20 and the third lens element 30, the third lens element 30 and the fourth lens element 40, and the fourth lens element 40 and the fifth lens element 50, respectively. According to the present embodiment, the first lens element 10, the second lens element 20, the third lens element 30, the fourth lens element 40 and the fifth lens element 50 are made of plastics, however, they may be made partially or all of glass. The present embodiment comprises five lens elements, however, the present invention is applicable as long as it is a lens assembly having two or more lens elements.

The first lens element 10 is disposed at a front/forward-most side and integrally comprises a lens portion 11 having convex surfaces on an object side and an image side, and an edge portion 12 of a periphery of the lens portion 11. A contact surface 13 is formed on the object side of the edge portion 12 so as to abut the receiving surface 4b of the lens barrel 2, and to be perpendicular to the optical axis P. An annular step portion 14 is formed on the image side of the edge portion 12. The annular step portion 14 comprises an inward-facing conical inclined surface 14a centered on the optical axis P and a ring plane 14b connecting to an outer periphery of the conical inclined surface 14a and facing the image side.

The second lens element 20 is adjacently disposed on the image side of the first lens element 10, and integrally comprises a lens portion 21 having a convex surface on the object side and a concave surface on the image side, and an edge portion 22 of a periphery of the lens portion 21. An annular step portion 23 is formed on the object side of the edge portion 22. The annular step portion 23 comprises an outward-facing conical inclined surface 23a centered on the optical axis P and a ring plane 23b connecting to an outer periphery of the conical inclined surface 23a and facing the object side. The conical inclined surface 23a abuts the conical inclined surface 14a of the first lens element 10 and the ring plane 23b abuts the ring plane 14b of the first lens element 10. In this way, the center of the first lens element 10 and the center of the second lens element 20 align on the optical axis P and an axis alignment is made. An annular step portion 24 is formed on the image side of the edge portion 22. The annular step portion 24 is comprises an inward-facing conical inclined surface 24a centered on the optical axis P and a ring plane 24b connecting to the outer periphery of the conical inclined surface 24a and facing the image side.

The third lens element 30 is adjacently disposed on the image side of the second lens element 20, and integrally comprises a lens portion 31 having concave surfaces both on the object side and the image side and being double-sided aspheric lens portion, and an edge portion 32 of a periphery of the lens portion 31. An annular step portion 33 is formed on the object side of the edge portion 32. The annular step portion 33 comprises an outward-facing conical inclined surface 33a centered on the optical axis P and a ring plane 33b connecting to an outer periphery of the conical inclined surface 33a and facing the object side. The conical inclined surface 33a abuts the conical inclined surface 24a of the second lens element 20 and the ring plane 33b abuts the ring plane 24b of the second lens element 20. In this way, the center of the second lens element 20 and the center of the third lens element 30 align on the optical axis P and an axis alignment is made. An annular step portion 34 is formed on the image side of the edge portion 32. The annular step portion 34 is comprises an inward-facing conical inclined surface 34a centered on the optical axis P and a ring plane 34b connecting to the outer periphery of the conical inclined surface 34a and facing the image side.

The fourth lens element 40 is adjacently disposed on the image side of the third lens element 30, and integrally comprises a lens portion 41 having a concave surface on the object side and a convex surface on the image side, and an edge portion 42 of a periphery of the lens portion 41. An annular step portion 43 is formed on the object side of the edge portion 42. The annular step portion 43 comprises an outward-facing conical inclined surface 43a centered on the optical axis P and a ring plane 43b connecting to an outer periphery of the conical inclined surface 43a and facing the object side. The fourth lens element 40 further comprises a light shielding portion 46 at the annular step portion 43 (namely, the conical inclined surface 43a and the ring plane 43b). The conical inclined surface 43a abuts the conical inclined surface 34a of the third lens element 30 through the light shielding portion 46, and the ring plane 43b abuts the ring plane 34b of the third lens element 30 through the light shielding portion 46. In this way, the center of the third lens element 30 and the center of the fourth lens element 40 align on the optical axis P and an axis alignment is made. The annular step portion 43 functions an abut portion for aligning the third lens element 30 as the other lens element, and is provided with the light shielding portion 46 made from a vapor-deposited film. An annular step portion 44 is formed on the image side of the edge portion 42. The annular step portion 44 is comprises an inward-facing conical inclined surface 44a centered on the optical axis P and a ring plane 44b connecting to the outer periphery of the conical inclined surface 44a and facing the image side.

The fifth lens element 50 is adjacently disposed on the image side of the fourth lens element 40, and comprises a lens portion 51 having a convex surface on the object side and a concave surface on the image side near an optical axis and being double-sided aspheric lens portion, and an edge portion 52 of a periphery of the lens portion 51. An annular step portion 53 is formed on the object side of the edge portion 52. The annular step portion 53 comprises an outward-facing conical inclined surface 53a centered on the optical axis P and a ring plane 53b connecting to an outer periphery of the conical inclined surface 53a and facing the object side. The conical inclined surface 53a abuts the conical inclined surface 44a of the fourth lens element 40, and the ring plane 53b abuts the ring plane 44b of the fourth lens element 40. In this way, the center of the fourth lens element 40 and the center of the fifth lens element 50 align on the optical axis P and an axis alignment is made. An annular step portion 54 is formed on the image side of the edge portion 52. The annular step portion 54 is comprises an outward-facing conical inclined surface 54a centered on the optical axis P and a ring plane 54b connecting to the outer periphery of the conical inclined surface 54a and facing the image side. The fixing member 5 fixed on an inner circumferential surface of the peripheral wall portion 3 of the lens barrel 2 is abutted on the annular step portion 54.

The plurality of light shielding plates 60 arranged in the imaging lens unit are ring plane shaped members made of synthetic resins such as non-translucent resin or metals to which shielding processing is applied. According to the present invention, the light shielding plates 60 are arranged between the second lens element 20 and the third lens element 30, between the third lens element 30 and the fourth lens element 40, between the fourth lens element 40 and the fifth lens element 50, respectively.

On a surface of the edge portion and the lens portions of the above-described the first lens element to the fifth lens element, anti-reflection coating (anti-reflection film) for preventing reflection of the light is provided. The AR coating on the fourth lens element 40 having the light shielding portion may be applied either before or after forming the light shielding portion 46.

Hereinafter, the light shielding portion 46 formed on the fourth lens element 40 will be described in detail. The light shielding portion 46 is configured by laminating the plurality of the vapor-deposited films. Specifically, as shown in FIG. 3(a), the light shielding portion 46 is configured by laminating, in order from the edge portion 42 (particularly, the conical inclined surface 43a and the ring plane 43b), a titanium layer 461a which is the vapor-deposited film made of titanium dioxide ($TiO_2$), a chromium layer 461b which is the vapor-deposited film made of chromium (Cr), and a titanium layer 461c which is the vapor-deposited film made of titanium dioxide ($TiO_2$). The chromium layer 461b is relatively excellent in shielding performance, however, is easy to occur film crack under high temperature and humidity environment if it is used in a single layer. On the other hand, when the titanium layers 461a and 461c are prepared having same thickness, the shielding performance is deteriorated compared to the chromium layer 461b and it is easy to occur film pealing under the high temperature and humidity environment. As shown in FIG. 3(a), a three layers configuration by laminating the titanium layers 461a and 461c and the chromium layer 461b alternatively can obtain the light shielding portion 46 which is excellent in film crack and pealing. In particular, when use is made under the high temperature and humidity environment, problems in reliability are solved by applying such laminating configuration.

Instead of the above-described light shielding portion 46, a light shielding portion 46A as shown in FIG. 3(b) may be applied. Such light shielding portion 46A is a five layers configuration formed by laminating silicon layers 462a and 462b which is the vapor-deposited film of the silicon oxide ($SiO_2$) so as to sandwich the above-described light shielding portion 46. Namely, the light shielding portion 46A has a five layer structure which the silicon layers 462a and 462b are configured to sandwich three layers made by laminating the titanium layers and the chromium layer alternatively. The silicon layers 462a and 462b effectively suppress reflection of the light entering to the light shielding portion 46A.

Instead of the light shielding portion 46, a light shielding portion 4B as shown in FIG. 3(c) may be applied. Such light shielding portion 46B is a five layers configuration formed by laminating the titanium layer 461a, the chromium layer 461b, the titanium layer 461c, the chromium layer 461d and the titanium layer 461e alternatively in the same manner as the above-described light shielding portion 46, and silicon layers 462a and 462b are provided so as to sandwich the five layers to form seven-layer configuration. Thus increasing the vapor-deposited film realizes improvement of the shielding performance. In such a configuration, as the titanium layer 461c at a center area, a vapor-deposited film of $TiO_3$ may be applied instead of the vapor-deposited film of $TiO_2$.

The light shielding portion 46 may be configured by a single layer made of the vapor-deposited film of the titanium or titanium oxide, or vapor-deposited film made of chromium, or may be configured by a plurality of the vapor-deposited films made of two more layers laminating the titanium layer and the chromium layer in accordance with a use environment. Furthermore, the light shielding portion 46 may be entirely formed with the edge portion 42 with an exception of the effective optical portion of the lens. Such light shielding portion may be provided not only on the annular step portion 43 of the above fourth lens element 40, but on either one or all of the annular step portion 14 of the first lens element 10, the annular step portions 23 and 24 of the second lens element 20, the annular step portions 33 and 34 of the third lens element 30, the annular step portions 43 and 44 of the fourth lens element 40 and the annular step portion 53 of the fifth lens element 50. Such light shielding portion effectively contributes to suppress the ghosting and the flares by selectively providing at areas where the unnecessary light is passes due to structural factors of the lens assembly 7.

According to the embodiment of the present invention, it is preferable that the thickness of the light shielding portion 46 is 50 nm or more. In particular, it is preferable that the film thickness of the chromium layer 461b is 50 nm or more, and the film thickness of the titanium layers 461a and 461c is 400 nm or more. Thus configured, the shielding performance can be effectively secured. It is preferable that the transmission rate of the light shielding portion 46 is 50% or less, and the reflection rate is 20% or less. Thus configured, degradation in the imaging performance is effectively suppressed by securing the shielding performance and suppressing reflection of the light. As the titanium layer, a vapor-deposited film of the titanium (Ti) or titanium oxide ($TiO_3$) may be applied. Instead of the vapor-deposited film of the silicon layers 462a and 462b, the vapor-deposited film of the magnesium fluoride ($MgF_2$) may be applied.

Next, effect according to the above embodiment of the present invention will be described referring to the accompanying drawing FIG. 4.

As shown in FIG. 4(a), in the imaging lens unit 1 of the present embodiment, the light L enters to an opening 4a of the lens barrel 2, penetrates the first lens element 10, passes in the second lens element 20, and goes toward the edge portion 22 after reflecting at the image side of the second lens element 20. The light L further passes through the edge portion 22 of the second lens element 20 and the edge portion 32 of the third lens element 30, however the light pass is shielded by the light shielding portion 46 of the fourth lens element 40 and the light L never reaches the imaging sensor S. On the other hand, as shown in FIG. 4(c), in an imaging lens unit 801 in which the light shielding portion 46 is not provided at the fourth lens element 40, the light L reaches the imaging sensor S and the ghosting and the flares are occurred.

As shown in FIG. 4(b), in the imaging lens unit 1 according to the present embodiment, the light L enters to the opening 4a of the lens barrel 2, penetrates each lens element and passes to the imaging sensor S, is reflected at an imaging surface of the imaging sensor S, further penetrates the fifth lens element 50 and goes to the edge portion 42 of the fourth lens element 40. However, the light pass is shielded by the light shielding portion 46 of the fourth lens element 40 and the light L never reaches the edge portion 32 of the third lens element 30. On the other hand, as shown in FIG. 4(b), in an imaging lens unit 801 in which the light shielding portion 46 is not provided at the fourth lens element 40, the light L passes through the edge portion 32 of the third lens element 30 and the edge portion 22 of the second lens element 20, and reaches the imaging sensor S again and, the ghosting and the flares are occurred.

As described above, according to the imaging lens unit 1 of the present embodiment, the light shielding portion 46 can be provided with an even thickness on the annular step portion 43 of the edge portion 42 of the fourth lens element 40, namely the abut portion on the third lens element 30. Accordingly, the unnecessary light passing the abut portion can be shielded without degradation in accuracy of the axis alignment of the lens elements. Thereby, it becomes possible to maintain accuracy of the axis alignment between the lens elements and effectively suppress the occurrence of the ghosting and flares. In addition, the mass productivity can be increased by applying the vapor deposition method to the light shielding portion 46.

The embodiments of the present invention are described above, however the present invention is not limited to these examples. Additions, deletions, and design changes made to the constituent elements by one skilled in the art with respect to the above-described embodiments are also included within the scope of the present invention, provided there are in the spirit of the present invention.

Performance Evaluation

Next, an evaluation is performed on the imaging performance and the reliability regarding the imaging lens unit according to Examples 1 to 3 of the present invention and a comparative example 1.

Example 1

In the imaging lens unit 1 of the above-described present embodiment, the light shielding portion 46 is configured as follows.
Titanium layer 461a: vapor-deposited film of $TiO_2$
Chromium layer 461b: vapor-deposited film of Cr
Titanium layer 461c: vapor-deposited film of $TiO_2$ Example 2

In the imaging lens unit 1 of the above-described example 1, instead of the light shielding portion 46, a light shielding portion 46A as shown in FIG. 3(b) having a five layer configuration is applied, and configured as follows.
Silicone layer 462a: vapor-deposited film of $SiO_2$
Titanium layer 461a: vapor-deposited film of $TiO_2$
Chromium layer 461b: vapor-deposited film of Cr
Titanium layer 461c: vapor-deposited film of $TiO_2$
Silicone layer 462b: vapor-deposited film of $SiO_2$ Example 3

In the imaging lens unit 1 of the above-described example 1, instead of the light shielding portion 46, a light shielding portion formed by a single titanium layer is applied, and configured as follows. Titanium layer: a vapor-deposited film of $TiO_2$ Comparative Example In the above-described example 1, configuration is basically same as the example 1, however, the light shielding portion 46 is not provided.

Evaluation Test of Imaging Performance

Camera units are prepared by assembling the imaging lens units of the Examples 1 to 3, and the comparative example 1, and an infrared cut filter and an imaging sensor, and confirmation was made if ghosting is existed on images taken by the camera unit. Determination criteria are as follows.
⊚ no occurrence of ghosting and flares
× occurrence of ghosting and flares Evaluation Test of Reliability Test of leaving under high temperature and humidity (85° C.–90° CRH 500 hours), and Test of leaving under low temperature (−40° C. 500 hours) were carried out to the imaging lens units of the Examples 1 to 3, and deterioration of the light shielding portion, and the imaging performance (occurrence of the ghosting and flares) were examined. Determination criteria are as follows.

◎ No pealing of the light shielding portion, no ghosting and the flares affecting the imaging performance ○ Slight pealing of the light shielding portion, without affecting the imaging performance, and × Pealing of the light shielding portion affecting the imaging performance, Determination criteria of general evaluation are as follows.

◎ Excellent in the imaging performance and reliability

○ including passing (not bad) in the imaging performance and reliability

× including bad in the imaging performance and reliability

The general evaluation is shown in Table 1

TABLE 1

|  | Imaging Performance | Reliability | General Evaluation |
|---|---|---|---|
| Example 1 | ◎ | ◎ | ◎ |
| Example 2 | ◎ | ◎ | ◎ |
| Example 3 | ◎ | ○ | ○ |
| Comparative Example 1 | X | — | X |

As shown in Table 1, the examples 1 and 2 show excellent results in the imaging performance and reliability, and excellent imaging performance was obtained over a long time under the high temperature and humidity environment and under the low temperature environment. Regarding the example 3, the excellent imaging performance was obtained. On the other hand, in the comparative example, the occurrence of the ghosting could not be suppressed and excellent imaging performance could not be obtained. Accordingly, the evaluation result shows an effect of the present invention.

REFERENCE SIGNS LIST

1 Imaging lens unit
2 Lens barrel
3 Peripheral wall portion
4 Front wall portion
4a Opening
4b Receiving surface
5 Fixing member
7 Lens assembly
10 First lens element
20 Second lens element
30 Third lens element
40 Fourth lens element
50 Fifth lens element
11, 21, 31, 41, 51 Lens portion
12, 22, 32, 42, 52 Edge portion
13 Contact surface
23, 33, 43, 53 Annular Step Portion
14, 24, 34, 44, 54 Annular Step Portion
23a, 33a, 43a, 53a Conical inclined surface
14a, 24a, 34a, 44a, 54a Conical inclined surface
23b, 33b, 43b, 53b Ring plane
14b, 24b, 34b, 44b, 54b Ring plane
46, 46A, 46B Light shielding portion
461a, 461c, 461e Titanium layer
461b, 461d Chromium layer
462a, 462b Silicon layer
60 Light shielding plate
P Optical axis
F Infrared cut filter
S Imaging sensor
L Light

The invention claimed is:

1. A lens element comprising a lens portion and an edge portion surrounding said lens portion, wherein said edge portion is provided with an abut portion for making axis alignment with other lens element, a light shielding portion formed of a vapor-deposited film is provided at an area of the edge portion including said abut portion, said light shielding portion is formed of a vapor-deposited film made of titanium or titanium oxide and a vapor-deposited film made of chromium, and said light shielding portion has a lamination structure having two or more layers in which the vapor-deposited film of the titanium or titanium oxide and the vapor-deposited film made of chromium are laminated alternatively.

2. A lens element according to claim 1, wherein a thickness of said light shielding portion is 50 nm or more.

3. A lens element according to claim 2, wherein transmission rate of said light shielding portion is 50% or less, and reflection rate is 20% or less.

4. A lens element according to claim 1 wherein a film thickness of said vapor-deposited film of said chromium is 50 nm or more.

5. A lens element according to claim 4 wherein a film thickness of said vapor-deposited film of said titanium or titanium oxide is 400 nm or more.

6. A lens element according to claim 5 wherein said light shielding portion is sandwiched with the vapor-deposited films made of silicon oxide or magnesium fluoride.

7. A lens element according to claim 6 wherein a film thickness of said vapor-deposited film of said silicon oxide or magnesium fluoride is 20 nm or more.

8. A lens element according to claim 4 wherein said light shielding portion is sandwiched with the vapor-deposited films made of silicon oxide or magnesium fluoride.

9. A lens element according to claim 8 wherein a film thickness of said vapor-deposited film of said silicon oxide or magnesium fluoride is 20 nm or more.

10. A lens element according to claim 1 wherein said light shielding portion is sandwiched with the vapor-deposited films made of silicon oxide or magnesium fluoride.

11. A lens element according to claim 10 wherein a film thickness of said vapor-deposited film of said silicon oxide or magnesium fluoride is 20 nm or more.

12. An imaging lens unit comprising a plurality of lens elements, wherein at least one lens element is according to claim 1.

* * * * *